(12) United States Patent
Nuño

(10) Patent No.: US 6,790,133 B2
(45) Date of Patent: Sep. 14, 2004

(54) SUSPENSION ASSEMBLY FOR MAGNETIC DISK GLIDE AND BURNISH APPLICATIONS

(75) Inventor: Gustavo Nuño, Murrieta, CA (US)

(73) Assignee: Acropolis Engineering Inc., Temecula, CA (US)

( * ) Notice: Subject to any disclaimer, the term of this patent is extended or adjusted under 35 U.S.C. 154(b) by 0 days.

(21) Appl. No.: 10/336,485

(22) Filed: Jan. 3, 2003

(65) Prior Publication Data

US 2003/0129935 A1 Jul. 10, 2003

Related U.S. Application Data

(60) Provisional application No. 60/345,327, filed on Jan. 4, 2002.

(51) Int. Cl.[7] .................................................. B24B 5/00
(52) U.S. Cl. ..................... 451/318; 451/312; 451/317; 29/90.01; 360/245; 73/105
(58) Field of Search ................................. 451/312, 317, 451/324, 319, 41, 59, 63, 901, 318; 29/90.01; 360/244.8, 245.1, 104, 245; 73/105

(56) References Cited

U.S. PATENT DOCUMENTS

| | | | |
|---|---|---|---|
| 4,845,816 A | 7/1989 | Nanis | 29/90.01 |
| 5,065,268 A | 11/1991 | Hagen | 360/244.8 |
| 5,166,847 A | 11/1992 | Zak | 360/245.1 |
| 5,657,187 A | 8/1997 | Hatch et al. | 360/244.8 |
| 5,689,064 A | 11/1997 | Kennedy et al. | 73/105 |
| 5,782,680 A | 7/1998 | Pilsan | 451/317 |
| 5,980,369 A | 11/1999 | Burga et al. | 451/317 |
| 6,272,909 B1 | 8/2001 | Yao et al. | 73/105 |
| 6,503,132 B2 | 1/2003 | Ekstrum et al. | 451/312 |

*Primary Examiner*—George Nguyen
(74) *Attorney, Agent, or Firm*—Gray Cary Ware & Freidenrich, LLP

(57) ABSTRACT

A glide/burnish suspension assembly processes magnetic memory storage disks by "flying" a glide/burnish slider across the surface of a rotating disk. A glide/burnish suspension assembly as described herein includes mounting holes and a tooling hole that are compatible with existing Type-2/Type-4 glide/burnish testing fixtures. The glide/burnish suspension assembly includes a stainless steel loadbeam that is compatible with Type-8/Type-20 designs, i.e., the loadbeam is configured to provide the structural support and rigidity required for use with smaller glide/burnish sliders. In this respect, the loadbeam can accommodate 70%, 50%, 30%, and possibly smaller glide/burnish sliders. The glide/burnish suspension assembly facilitates the continued use of "older" Type-2/Type-4 fixtures to perform gliding and/or burnishing of disks using the "newer" Type-8/Type-20 loadbeams designed to support 30% sliders.

27 Claims, 5 Drawing Sheets

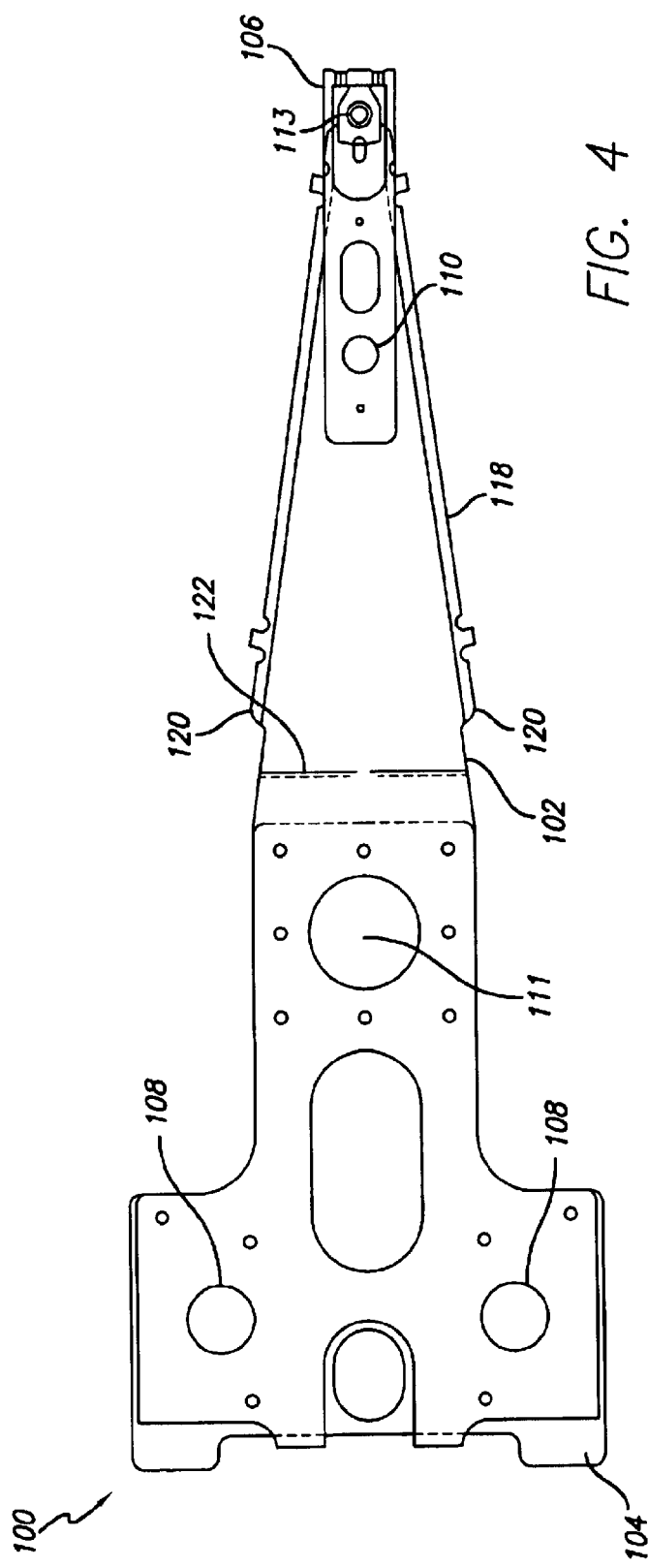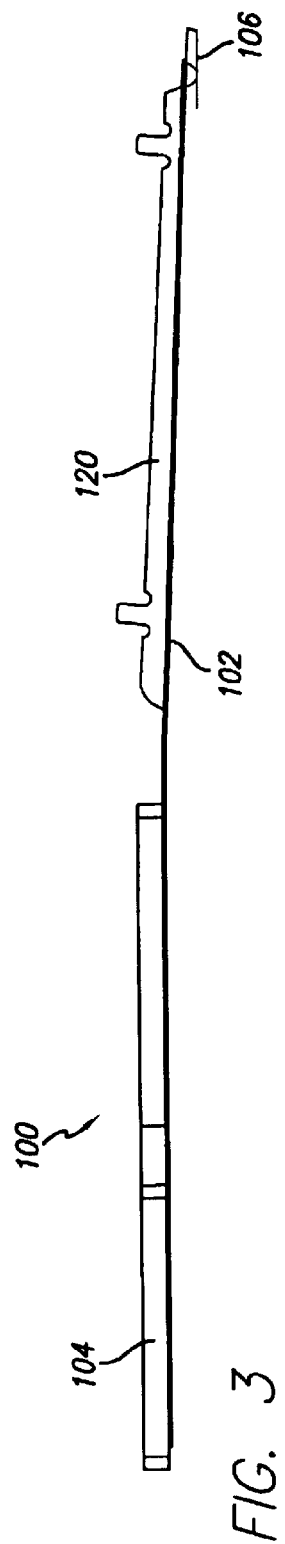

SUSPENSION ASSEMBLY FOR MAGNETIC DISK GLIDE AND BURNISH APPLICATIONS

RELATED APPLICATION

This-application claims priority of United States provisional patent application serial No. 60/345,327, filed Jan. 4, 2002 the content of which is hereby incorporated by reference.

FIELD OF THE INVENTION

The present invention relates generally to magnetic disk manufacturing equipment. More particularly, the present invention relates to a suspension assembly for holding a glide and burnish slider.

BACKGROUND OF THE INVENTION

Magnetic disks are commonly used in computer hard drives. The magnetic disks are burnished and surface-tested before they are installed into the hard drive package. The glide and burnish process is performed by moving a glide/burnish slider across the surface of the hard disk. Hard disks are currently manufactured in accordance with the newer 30% format that requires smaller glide and burnishing sliders and smaller read/write heads. In this context, 30% refers to the approximate linear dimensions of the slider relative to the standard "full size" or 100% slider, which was introduced in the year 1981. A full size slider has a length of 160 mils; a width of 125 mils, and a height of 35 mils. In contrast, a 30% slider (introduced in 1994) has a length of 49 mils, a width of 39 mils, and a height of 12 mils. The length, width, and height dimensions of a 50% slider are 80 mils, 63 mils, and 17 mils, respectively, and the length, width, and height dimensions of a 70% slider are 112 mils, 88 mils, and 24 mils, respectively.

The smaller 30% glide/burnish sliders are conventionally mounted to Type-8 suspensions that are specifically configured to provide increased stability and head placement relative to older Type-2 suspensions. For example, Type-8 suspensions are shorter than Type-2 suspensions. As used herein, the "Type" is an industry-accepted term that defines specific physical, mechanical, and operating characteristics of suspensions designed for deployment in a hard disk drive. The various Type designators are also used to distinguish different classes of suspensions designed for deployment in glide/burnish applications.

Type-2, Type-4, and Type-8 suspensions are individual and progressive designs that vary according to their respective basic requirements. These basic designs are then expanded in the final assembly process to accommodate the various read/write glide or burnish sliders (e.g., 70%, 50%, or 30% sliders), according to the final intended use of the assemblies. This accommodation is accomplished by alternate design and material thickness changes in the required individual gimbal sub-assembly, subsequently attached to the original basic load beam and mount design during final suspension assembly. For example, typical gimbal material thickness is 0.002 inch for 70% sliders, 0.0015 inch for 50% sliders, and 0.0012 inch for 30% sliders. Thus, the different suspension types are produced in their own unique basic design configurations, with the addition of individual gimbal assemblies, designed to carry different sized sliders as required (or all optional combinations).

Newer test fixtures and tooling are compatible with the Type-8 suspension format, thus enabling effective glide and burnishing of hard disks with 30% sliders. However, older tooling and equipment for glide and burnishing heads are typically configured to only accommodate the outdated Type-2 suspension format (Type-2 suspension technology is approximately 20 years old). For example, a Type-2 suspension includes two mounting holes for mounting the suspension to the test fixture; two screws or bolts are used to mount each Type-2 suspension. In contrast, the later design Type-8 suspension utilizes a single mounting boss with a swage hole that receives a test fixture location pin or swaging ball to facilitate an interference fit engagement. A plurality of Type-8 suspensions can be mounted to the test fixture or drive actuator assembly using only one swage mounting ball.

Unfortunately, existing Type-2 suspension assemblies cannot be effectively retrofitted to accommodate 30% glide and burnishing sliders; the Type-2 suspensions, which are designed to hold 70% sliders, do not provide adequate stability and rigidity for the smaller 30% sliders. Consequently, users of older equipment must either purchase new equipment compatible with Type-8 glide and burnishing suspensions, or modify their existing tooling to accommodate the Type-8 suspensions. Either solution can be extremely cost prohibitive.

BRIEF SUMMARY OF THE INVENTION

A glide and burnishing suspension configured in accordance with the present invention can utilize a 70%, 50%, 30%, or smaller size glide and burnishing slider on a suspension load beam that is otherwise compatible with test fixtures designed to only accommodate Type-2 suspensions. The glide and burnishing suspension with the appropriate 70%, 50%, 30%, or smaller gimbal provides the requisite structural stability and rigidity necessary to support the above mentioned glide and burnishing sliders, i.e., the glide and burnishing suspension exhibits the stability of newer Type-8 suspensions. The glide and burnishing suspension serves as a direct retrofit replacement for existing Type-2 glide and burnishing suspensions utilized in older test equipment and/or tooling.

The above and other aspects of the present invention may be carried out in one form by a magnetic disk glide/burnish suspension loadbeam that includes at least a mounting end having mounting holes formed therein, a gimbal end opposite the mounting end, a tapered section between the mounting end and the gimbal end, and a tooling hole formed within the tapered section. The gimbal end is configured to receive a glide/burnish slider, the tapered section is Type-8/Type-20 compatible, and the tooling hole and the mounting holes are Type-2/Type-4 compatible.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

FIG. 3 is a side view of the glide and burnish suspension shown in FIG. 1;

FIG. 4 is a plan view of the glide and burnish suspension shown in FIG. 1;

DETAILED DESCRIPTION OF A PREFERRED EMBODIMENT

Figure 1:
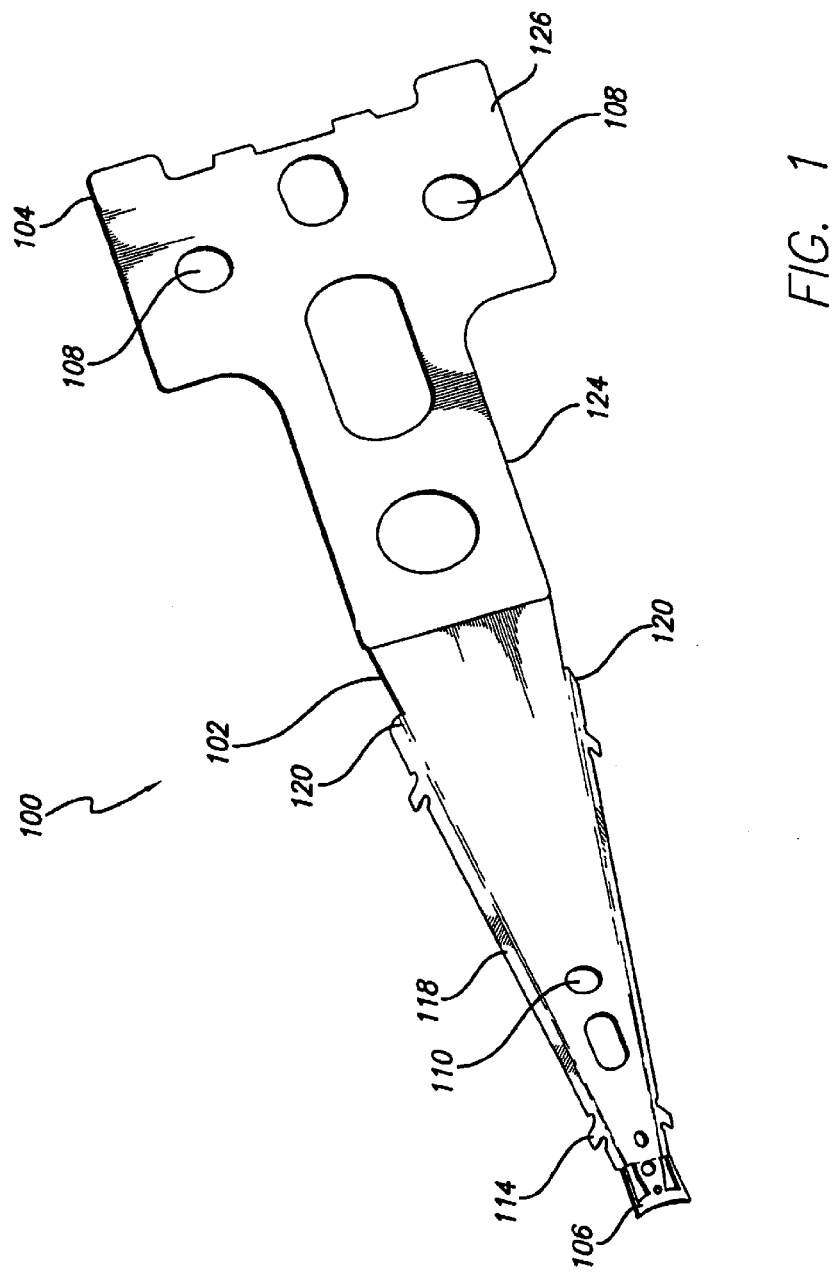
FIG. 1 is a top perspective view of a glide and burnish suspension configured in accordance with the present invention.
Figure 2:
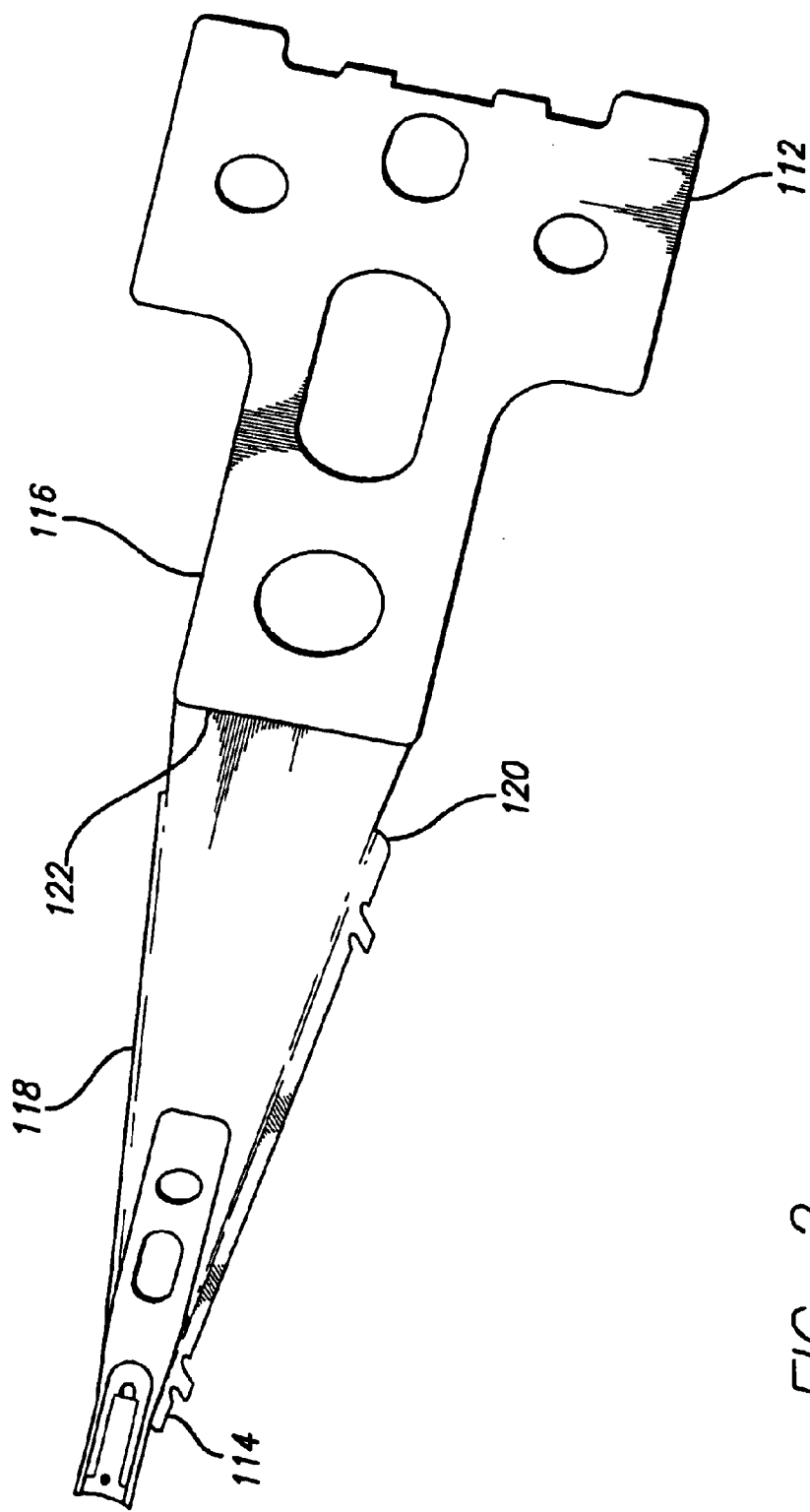
FIG. 2 is a bottom perspective view of the glide and burnish suspension shown in FIG. 1.
Figure 5:
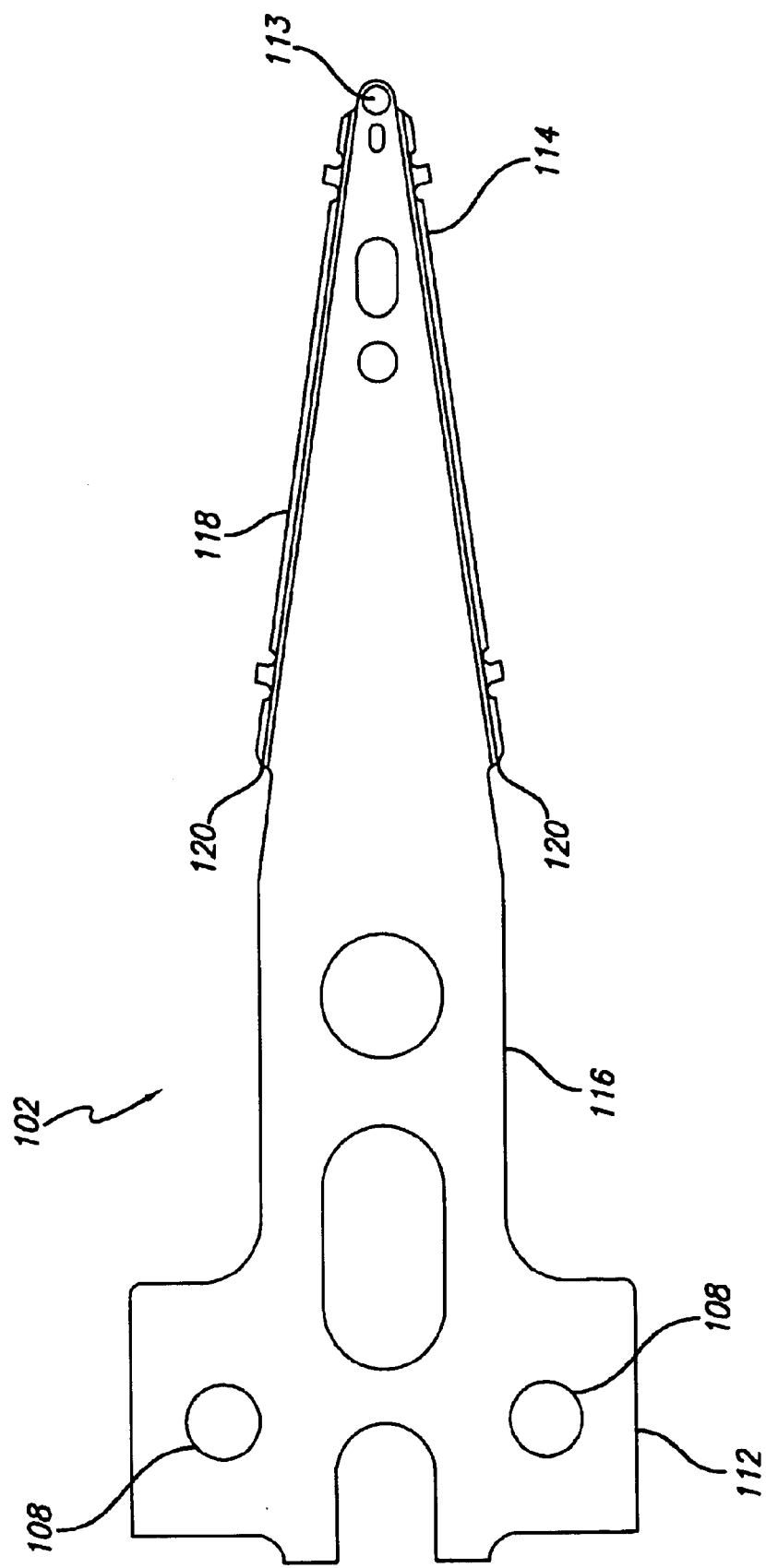
FIG. 5 is a top view of a load beam configured in accordance with the present invention.
Figure 6:
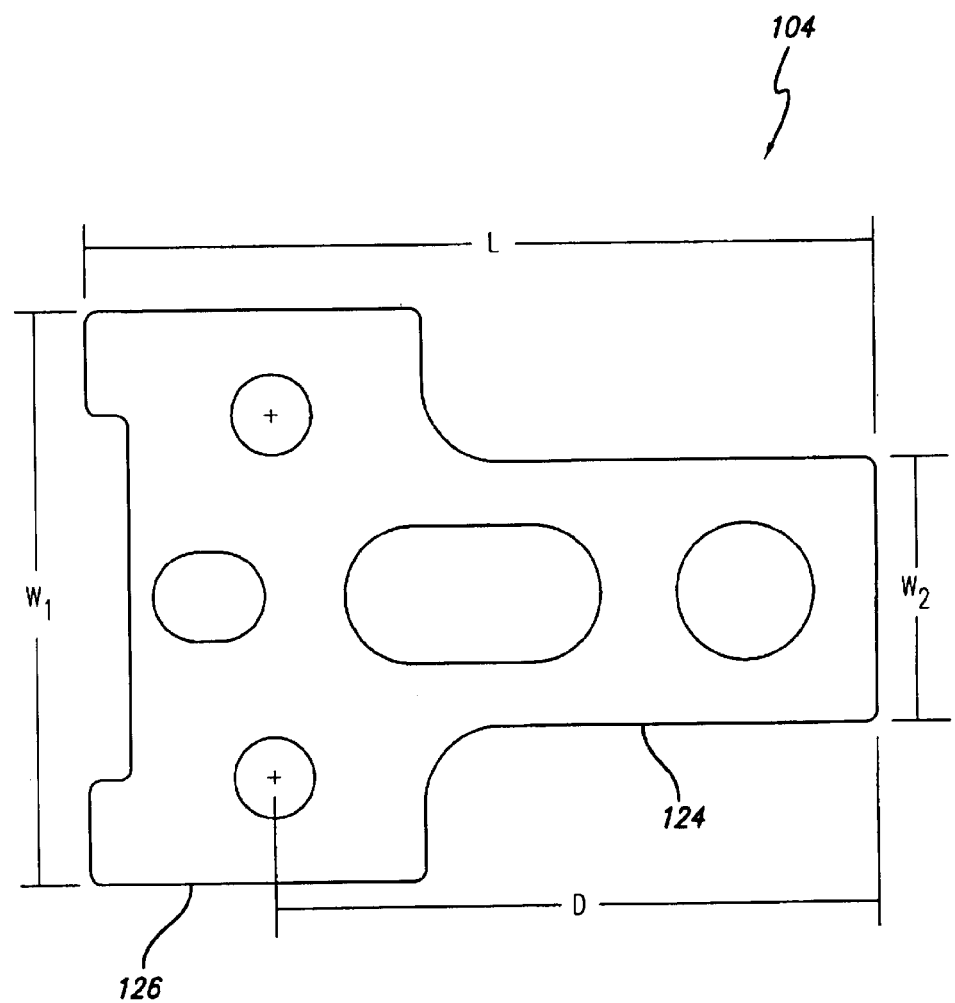
FIG. 6 is a top view of a spacer configured in accordance with the present invention.

A suspension assembly 100 suitable for glide and burnishing of hard disks is shown in FIGS. 1–4. The suspension assembly 100 generally includes a load beam 102, a spacer 104, and a gimbal 106. FIG. 6 depicts the spacer 104, and FIG. 5 depicts the load beam 102. In accordance with one practical embodiment, these three components are welded together using a conventional laser welding technique. FIG. 4 depicts the weld locations as small circles (14 weld locations for attaching the spacer 104 to load beam 102, and two weld locations for attaching the gimbal 106 to load beam 102). As shown in FIGS. 1 and 2, gimbal 106 is attached to one side of load beam 102 and spacer 104 is attached to the other side of load beam 102 (an alternate practical embodiment may have gimbal 106 and spacer 104 attached to the same side of load beam 102). Gimbal 106 is located near one end of load beam 102 (referred to herein as the "gimbal end") and is mounted such that a portion thereof extends beyond the tip of load beam 102. Spacer 104 is located at the opposite end of load beam 102 (referred to herein as the "mounting end") and is configured to provide structural support to load beam 102. Prior to use in burnishing or gliding a hard disk, a suitable burnishing or gliding slider or head (not shown) is affixed to gimbal 106.

When deployed for practical operation, the suspension assembly 100 (with an attached slider) is mounted to an appropriate fixture to perform the burnishing and/or the gliding procedure. Suspension assembly 100, with gliding slider or head, is attached at the mounted end into the test fixture. This allows the slider to be loaded and placed in contact with the surface of the hard disk, which is being independently spun around its central axis. The test fixture with suspension assembly 100 and the slider head assembly is then driven to traverse the slider across the rotating surface of the hard disk from the outside edge toward the inside edge. The motion of the suspension assembly 100 is akin to the movement of a stylus arm in a phonograph record player. Such glide and/or burnishing fixtures and their operation are known to those familiar with the prior art. Accordingly, they are not described in detail herein.

The suspension assembly 100 is mounted to the fixture using at least one (or, in the example embodiment, two) mounting holes 108 and a tooling hole 110. Suspension assembly 100 generally includes a central longitudinal axis 111, as identified in FIG. 4. Axis 111 is shared by spacer 104, loadbeam 102, and gimbal 106. As best shown in FIG. 4 and FIG. 5, each of the two mounting holes 108 has a center point located on a perpendicular line relative to axis 111. In the practical embodiment, the two mounting holes 108 are equally spaced (along this perpendicular line) away from central longitudinal axis 111. Tooling hole 110 is preferably located such that its center point is aligned with axis 111, as shown in FIG. 4.

In the example embodiment, each mounting hole 108 is circular and each is approximately 0.0545 inch in diameter, while tooling hole 110 is also circular with a diameter of approximately 0.0315 inch. The center-to-center distance between the two mounting holes 108 is approximately 0.25 inch. The distance (along the longitudinal axis of load beam 102) between the center of each of the two mounting holes 108 and the center of tooling hole 110 is approximately 0.830 inch. This 0.830 inch dimension is illustrated in FIG. 4. The size of mounting holes 108, the spacing between the mounting holes 108, and the 0.830 inch distance correspond to Type-2/Type-4 suspension dimensions. In accordance with one practical embodiment, the distance (along the longitudinal axis of load beam 102) between the terminating edge of spacer 104 and the center of tooling hole 110 is approximately 0.959 inch. This 0.959 inch dimension is also illustrated in FIG. 4. Load beam 102 and gimbal 106 each include a respective tooling hole formed therein; these tooling holes are aligned during welding of suspension assembly 100, thus forming tooling hole 110. Similarly, load beam 102 and spacer 104 each include respective mounting holes formed therein; these mounting holes are aligned during welding of suspension assembly 100, thus forming mounting holes 108.

Gimbal 106 is designed to allow the slider to pivot such that the slider maintains a proper alignment relative to the surface of the hard disk during the glide/burnish procedure. The distance (along the longitudinal axis of load beam 102) between the center of tooling hole 110 and the center of a gimbal dimple 113 (and the pivot point of the slider) is approximately 0.210 inch. This 0.210 inch dimension is illustrated in FIG. 4. Dimple 113, which is formed in gimbal 106 and, possibly, loadbeam 102, corresponds to the mounting location of the glide/burnish slider (not shown). In practical embodiments, dimple 113 is aligned with the center of the glide/burnish slider, and the 0.210 inch dimension applies to all slider sizes, e.g., 30% and smaller glide/burnish sliders. In the preferred embodiment, gimbal 106 is formed from stainless steel having an approximate thickness from 0.0012 inch to 0.002 inch, dependant on the particular design. The particular size, shape, and configuration of gimbal 106 may vary depending upon the configuration of the slider. For example, gimbal 106 may be relatively large to accommodate a 70% slider or relatively small to accommodate a 30% slider. Gimbal 106 can be suitably configured in accordance with conventional gimbal designs. Accordingly, gimbal 106 and its operation will not be described in detail herein.

In the preferred embodiment, load beam 102 is formed from stainless steel having a thickness of approximately 0.0030 inch. Load beam 102 has a mounting end 112, a gimbal end 114, and a main body portion between mounting end 112 and gimbal end 114. Mounting end 112, which is shaped to accommodate spacer 104, has two mounting holes formed therein (as described above, these two mounting holes form mounting holes 108 in suspension assembly 100). In this respect, mounting end 112 is configured for mounting compatibility with Type-2/Type-4 glide and burnish, read and write, or test tooling. Mounting end 112 extends to a substantially straight center portion 116 that is shaped to accommodate spacer 104. As best shown in FIGS. 1, 2, and 4, spacer 104 is attached to load beam 102 such that it overlaps a significant portion of mounting end 112 and center portion 116.

The body portion of load beam 102 includes a tapered section 118 that extends from center portion 116 to gimbal end 114. Tapered section 118 is shaped to resemble a triangle, as shown in the various figures, such that it is wider near the mounting end and narrower near the gimbal end. In the preferred practical embodiment, each side of tapered section 118 defines an angle of approximately 7.78 degrees relative to the longitudinal axis of load beam 102. This angle is illustrated in FIG. 4. Tapered section 118 includes a tooling hole formed therein (as described above, this hole forms tooling hole 110 in suspension assembly 100). In the practical example described herein, tapered section 118 is Type-8/Type-20 compatible in that it is sized, shaped, and configured to provide sufficient structural, mechanical, dynamic, and other physical characteristics that are normally associated with conventional Type-8/Type-20 loadbeams. Load beam 102 is formed with side rails 120, which extend along tapered section 118. Side rails 120 add structural rigidity and stability to load beam 102. In the example embodiment, the height of each side rail 120 above the plane of load beam 102 is approximately 0.021 inch (as depicted in FIG. 3).

As best shown in FIG. 3, load beam 102 may be slightly bent, along a line 122 perpendicular to its longitudinal axis (line 122 is shown in FIG. 4), to provide a suitable height or deflection dimension (resulting in an offset between the plane defined by mounting end 112 and the gimbal end 114). The bend in load beam 102 may vary to suit the needs of the particular application.

Load beam 102 is configured and dimensioned for compatibility with "older" glide and burnish fixtures that are designed to accommodate-Type-2 suspensions. In other words, the mounting holes and the tooling hole on load beam 102 are sized and located such that suspension assembly 100 can be installed on Type-2 (and Type-4) fixtures. In this regard, the mounting holes and the tooling hole are Type-2/Type-4 compatible. However, unlike conventional Type-2/Type-4 suspension assemblies, load beam 102 can accommodate the newer 30% (and smaller) sliders. In this regard, tapered section 118 and gimbal end 114 may be configured in accordance with Type-8 or Type-20 suspension assemblies.

Spacer 104 is preferably formed from stainless steel having a thickness of approximately 0.0200 inch. Spacer 104 includes an extended neck portion 124 that provides increased rigidity and support to load beam 102 (which is important when using 30% or smaller sliders). As described above, for compatibility with older Type-2/Type-4 equipment, the two mounting holes formed in spacer 104 are each approximately 0.054 inch in diameter, and their centers are approximately 0.25 inch apart. The overall longitudinal length (L) of spacer 104 is approximately 0.5537 inch, the width (W1) of spacer 104 at its widest point (i.e., across the mounting end 126 containing the mounting holes) is approximately 0.4 inch, and the width (W2) of spacer 104 along the extended neck portion 124 is approximately 0.19 inch. These three dimensions are indicated in FIG. 6. The distance (along the longitudinal axis of spacer 104) from the center of the mounting holes to the tip of the extended neck portion 124 is approximately 0.4245 inch. This distance (D) is also indicated in FIG. 6. The extended neck portion 124 provides added stability and rigidity to suspension assembly 100, relative to conventional Type-2/Type-4 suspensions.

In summary, older glide and burnishing fixtures only accommodate Type-2 or Type-4 suspensions (which are designed to carry 70% sliders). The hard disk industry evolved with the introduction of Type-8 suspensions and 50% sliders. Type-8 suspensions are significantly shorter than Type-2/Type-4 suspensions and they require different mounting configurations when used in a glide/burnish fixture. However, hard disk manufacturers can still utilize older Type-2/Type-4 glide/burnish fixtures by attaching a 50% slider to a Type-2/Type-4 suspension. Indeed, most hard disk manufacturers have not retrofitted or replaced Type-2/Type-4 glide/burnish equipment because the older equipment can adequately process hard disks with 50% sliders. Unfortunately, this solution cannot be extended for use with 30% or smaller sliders because the stability and head placement of conventional Type-2 suspensions is inferior to that of conventional Type-8 suspensions. Consequently, unless suspension assembly 100 is utilized, hard disk manufacturers must either replace the older glide/burnish equipment or perform costly modifications to the older equipment to make them compatible with Type-8/Type-20 suspensions. Suspension assembly 100 bridges the gap between the older and the newer suspension technologies—older glide/burnish fixtures can now be used to process hard disks with 30% (and smaller) sliders. In this respect, suspension assembly 100 combines the stability and mechanical characteristics of newer Type-8/Type-20 suspensions with the fixture mounting configuration of older Type-2/Type-4 suspensions. These older fixtures are widely used throughout the hard disk manufacturing industry and, consequently, suspension assembly 100 will be in high demand as a retrofit item.

The present invention has been described above with reference to a preferred embodiment. However, those skilled in the art having read this disclosure will recognize that changes and modifications may be made to the preferred embodiment without departing from the scope of the present invention. For example, the various nominal dimensions provided herein may vary according to reasonable manufacturing tolerances and/or to accommodate gliding/burnishing fixtures that are not configured in accordance with the large majority of existing fixtures. These and other changes or modifications are intended to be included within the scope of the present invention, as expressed in the following claims.

What is claimed is:

1. A magnetic disk glide/burnish suspension loadbeam comprising:
    a mounting end having at least one mounting hole formed therein;
    a gimbal end opposite said mounting end, said gimbal end being configured to receive a glide/burnish slider;
    a tapered section between said mounting end and said gimbal end, said tapered section being Type-8/Type-20 compatible; and
    a tooling hole formed within said tapered section, said tooling hole and said at least one mounting hole being Type-2/Type-4 compatible.

2. A loadbeam according to claim 1, wherein said gimbal end is configured to accommodate a glide/burnish slider having a size specification of 70%, 50%, 30%, or smaller.

3. A loadbeam according to claim 1, wherein:
    said loadbeam has a central longitudinal axis; and
    said at least one mounting hole comprises two mounting holes, each having a center located on a perpendicular line relative to said central longitudinal axis.

4. A loadbeam according to claim 3, wherein each of said two mounting holes is equally spaced, along said perpendicular line, away from said central longitudinal axis.

5. A loadbeam according to claim 3, wherein said two mounting holes are positioned such that their center-to-center distance is approximately 0.25 inch.

6. A loadbeam according to claim 3, wherein each of said two mounting holes defines a circle having a diameter of approximately 0.0545 inch.

7. A loadbeam according to claim 3, wherein said two mounting holes are positioned such that the distance, along said central longitudinal axis, between the center of each of said two mounting holes and the center of said tooling hole is approximately 0.83 inch.

8. A loadbeam according to claim 7, wherein the center of said tooling hole is located on said central longitudinal axis.

9. A loadbeam according to claim 1, further comprising a gimbal dimple located at said gimbal end, wherein the distance, along said central longitudinal axis, between the center of said tooling hole and the center of said gimbal dimple is approximately 0.210 inch.

10. A loadbeam according to claim 1, wherein said tooling hole defines a circle having a diameter of approximately 0.0315 inch.

11. A magnetic disk glide/burnish suspension assembly comprising:
   a loadbeam having a mounting end, a gimbal end opposite said mounting end, and a body portion between said mounting end and said gimbal end, said gimbal end being Type-8/Type-20 compatible;
   a spacer attached to said load beam at said mounting end;
   a gimbal attached to said loadbeam at said gimbal end;
   at least one mounting hole formed through said mounting end and said spacer; and
   a tooling hole formed through said body portion, said tooling hole and said at least one mounting hole being Type-2/Type-4 compatible.

12. A glide/burnish suspension assembly according to claim 11, wherein said spacer is rigid, relative to said loadbeam, to provide structural support to said loadbeam.

13. A glide/burnish suspension assembly according to claim 11, wherein said gimbal is configured to receive a glide/burnish slider having a size specification of 70%, 50%, 30%, or smaller.

14. A glide/burnish suspension assembly according to claim 11, wherein:
   said loadbeam and said spacer share a central longitudinal axis; and
   said at least one mounting hole comprises two mounting holes, each having a center located on a perpendicular line relative to said central longitudinal axis.

15. A glide/burnish suspension assembly according to claim 14, wherein each of said two mounting holes is equally spaced, along said perpendicular line, away from said central longitudinal axis.

16. A glide/burnish suspension assembly according to claim 14, wherein said two mounting holes are positioned such that their center-to-center distance is approximately 0.25 inch.

17. A glide/burnish suspension assembly according to claim 14, wherein each of said two mounting holes defines a circle having a diameter of approximately 0.0545 inch.

18. A glide/burnish suspension assembly according to claim 14, wherein said two mounting holes are positioned such that the distance, along said central longitudinal axis, between the center of each of said two mounting holes and the center of said tooling hole is approximately 0.83 inch.

19. A glide/burnish suspension assembly according to claim 18, wherein the center of said tooling hole is located on said central longitudinal axis.

20. A loadbeam according to claim 11, wherein said tooling hole defines a circle having a diameter of approximately 0.0315 inch.

21. A magnetic disk glide/burnish suspension assembly comprising a suspension loadbeam including a mounting end having at least one mounting hole formed therein, a gimbal end opposite said mounting end, said gimbal end being configured to accommodate a glide/burnish slider having a size specification of 70%, 50%, 30%, or smaller, a body section between said mounting end and said gimbal end, and a tooling hole formed within said body section, said tooling hole and said at least one mounting hole being Type-2/Type-4 compatible.

22. A glide/burnish suspension assembly according to claim 21, wherein said body section comprises a tapered section between said mounting end and said gimbal end, said tapered section and said gimbal end being Type-8/Type-20 compatible.

23. A glide/burnish suspension assembly according to claim 22, further comprising a spacer attached to said loadbeam at said mounting end, wherein said at least one mounting hole is formed through said mounting end and said spacer.

24. A glide/burnish suspension assembly according to claim 22, further comprising a gimbal attached to said loadbeam at said gimbal end, wherein said tooling hole is formed through said body portion.

25. A glide/burnish suspension assembly according to claim 22, wherein:
   said loadbeam has a central longitudinal axis; and
   said at least one mounting hole is positioned such that the distance, along said central longitudinal axis, between the center of said at least one mounting hole and the center of said tooling hole is approximately 0.83 inch.

26. A glide/burnish suspension assembly according to claim 25, wherein the center of said tooling hole is located on said central longitudinal axis.

27. A loadbeam according to claim 26, wherein said tooling hole defines a circle having a diameter of approximately 0.0315 inch.

* * * * *